US008907627B2

(12) United States Patent
Doornekamp

(10) Patent No.: US 8,907,627 B2
(45) Date of Patent: Dec. 9, 2014

(54) BALANCER CIRCUIT FOR RECHARGEABLE BATTERIES

(75) Inventor: Marinus Hendrikus Doornekamp, Hengelo (NL)

(73) Assignee: Super B B.V., Hengelo (OV) (NL)

( * ) Notice: Subject to any disclaimer, the term of this patent is extended or adjusted under 35 U.S.C. 154(b) by 727 days.

(21) Appl. No.: 13/082,967

(22) Filed: Apr. 8, 2011

(65) Prior Publication Data

US 2012/0256591 A1  Oct. 11, 2012

(51) Int. Cl.
*H02J 7/00* (2006.01)

(52) U.S. Cl.
CPC .................................. *H02J 7/0016* (2013.01)
USPC ............................ 320/118; 320/119; 320/122

(58) Field of Classification Search
CPC ....................................................... H02J 7/0016
USPC ................................................. 320/118, 122
See application file for complete search history.

(56) References Cited

U.S. PATENT DOCUMENTS

| | | | |
|---|---|---|---|
| 6,211,650 B1* | 4/2001 | Mumaw et al. | 320/122 |
| 2003/0111979 A1* | 6/2003 | Cheiky et al. | 320/137 |
| 2010/0283434 A1* | 11/2010 | Kakiuchi | 320/166 |
| 2011/0140665 A1* | 6/2011 | Tamezane et al. | 320/118 |

* cited by examiner

*Primary Examiner* — Edward Tso
*Assistant Examiner* — Ahmed Omar
(74) *Attorney, Agent, or Firm* — Jordan IP Law, LLC; Todd A. Vaughn

(57) ABSTRACT

A balancer circuit for a cell in a rechargeable battery, having connecting terminals for connection of the balancer circuit to the cell. A first resistor is electrically connected to one of the connecting terminals and a voltage switch is arranged in series with the first resistor and electrically connected to the other one of the connecting terminals. The voltage switch, e.g., an adjustable voltage reference circuit, is operable to shunt a balancing current through the first resistor when a load voltage sensed over the connecting terminals is higher than a threshold voltage.

12 Claims, 2 Drawing Sheets

BALANCER CIRCUIT FOR RECHARGEABLE BATTERIES

FIELD OF THE INVENTION

Embodiments relate generally to a balancer circuit for a cell of a rechargeable battery, and includes connecting terminals permitting the electrical connection of the balancer circuit to the cell.

BACKGROUND

International patent publication WO2010114806 discloses a charge-balancing system for multiple cells in a battery. The system includes multiple circuits and a control module. Each circuit includes first and second switches connected in series and an inductance having a first end connected between the first and second switches. The control module outputs control signals to control the first and second switches. A second end of the inductance of a first one of the N circuits is connected between two cells of a first pair of series-connected cells of a battery stack. The first and second switches of the first one of the N circuits are connected in parallel to the first pair of 2N series-connected cells.

SUMMARY

Embodiments of the invention provides a cost effective and easy to implement solution for providing a reliable balancing functionality for battery packs having multiple cells.

In accordance with embodiments, a balancer circuit includes at least one of the following: a first resistor connected to one of a two or more connecting terminals; and a voltage switch in series with the first resistor and connected to the other one of the connecting terminals. The voltage switch is configured to shunt a balancing current through the first resistor when a load voltage sensed over the connecting terminals is higher than a threshold voltage.

Embodiments of the invention permit the implementation of a simple electronic circuit using cost-efficient components to provide the function of cell balancing in a battery pack. A battery pack may be provided including a plurality of rechargeable cells, which is provided with one or more balancing circuits for each one of the plurality of rechargeable cells. Furthermore, a battery pack including a plurality of rechargeable cells in a series configuration may be provided, further including a balancer arrangement for the series configuration of cells. The electronic components of the balancer circuit may be provided on very small PCB's or similar carriers, and easily integrated with the battery pack. When positioning the circuits of embodiments spatially in close proximity to each cell, the size of the battery pack will not be affected at all.

DRAWINGS

Embodiments of the invention will be discussed in more detail below, using a number of exemplary embodiments, with reference to the attached drawings, which illustrate the following.

Figure 1:
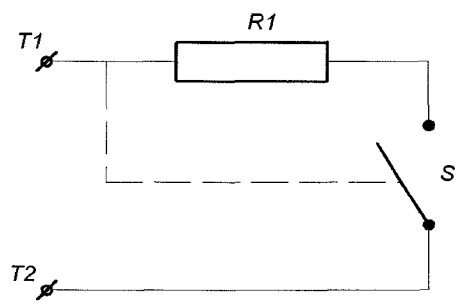

Example FIG. 1 illustrates a circuit diagram of a balancing circuit, in accordance with embodiments.

Figure 2:
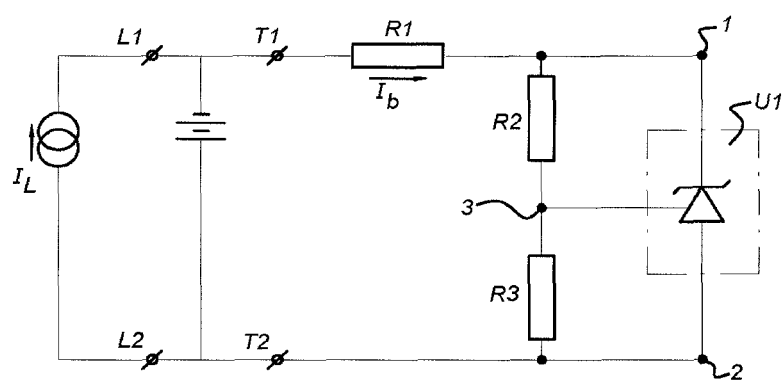

Example FIG. 2 illustrates an circuit diagram of a further embodiment of a balancing circuit, in accordance with embodiments.

Figure 3:
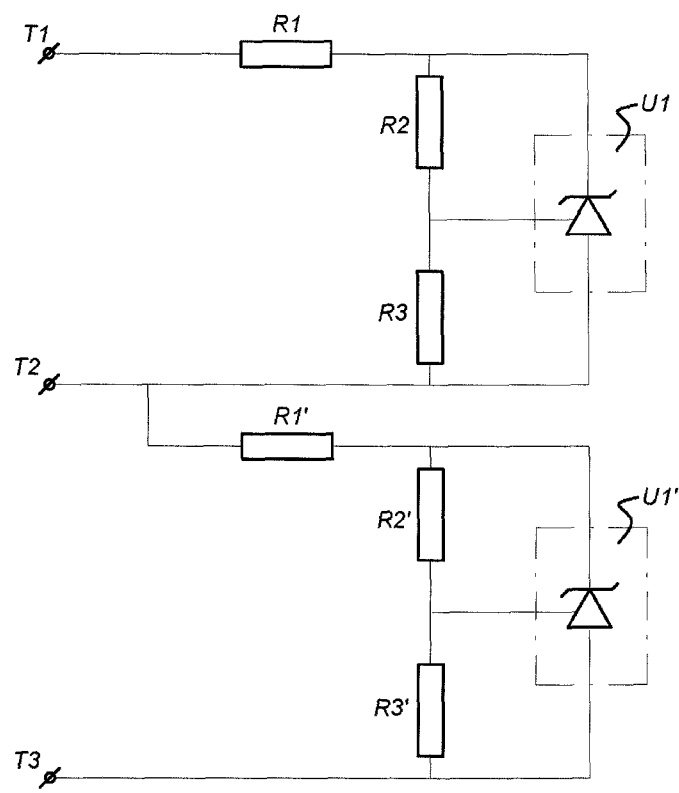

Example FIG. 3 illustrates a circuit diagram of a series configuration of an embodiment of the balancing circuit, in accordance with embodiments.

DESCRIPTION

Cells in battery packs of contemporary rechargeable batteries for a wide range of applications (e.g., automotive) need special attention during a charged stage. Due to manufacturing tolerances and other factors, the cells in a battery pack may slightly differ from one another. In order to make sure that charging can take place without risk, and to prolong the life of cells in a battery pack, controlled charging is a much used technique. As multiple cells are usually present in battery packs, in parallel, series or a combination of parallel and series configuration, balancing of each cell is very important in order to obtain similar voltages for each cell. In the present invention embodiments, parallel discharging using a shunt is implemented to even out differences between cells.

Example FIG. 1 illustrates a circuit diagram of a balancer circuit in accordance with embodiments. The balancer circuit includes a pair of connecting terminals T1, T2 configured to permit an electrical connection of the balancer circuit to a battery pack cell, a first resistor R1 electrically connected to one of the connecting terminals T1, T2, and a voltage switch S electrically connected in series with the first resistor R1 and electrically connected to the other one of the connecting terminals T1, T2. In accordance with embodiments, the voltage switch S is operable to shunt a balancing current through the first resistor R1 when a load voltage sensed over the connecting terminals T1, T2 is higher than a threshold or predetermined voltage.

While the cell for which the balancer circuit in accordance with embodiments are suitable can be, for example, a lithium-based cell (e.g., Li Ion, Li Polymer, LiFePO4, etc.), other types of rechargeable cell types can be used.

The switch S illustrated in example FIG. 1 with the functionality as described herein can be implemented as a voltage reference circuit U1, for example, in a configuration as illustrated in example FIG. 2. More specifically, the element U1 can be an adjustable voltage reference circuit which allows to accurately set the threshold voltage for embodiments of the invention. For example, the element U1 can be a three terminal adjustable (band-gap) voltage reference diode, as commercially available under the designation LM385 from National Semiconductor. In general, any switch type of element or component which provides for an increase in conductivity as a function of voltage applied may be used as switch S in accordance with embodiments. Such an element or component can take the form, for example, of a Zener diode. The higher the increaser rate as function of voltage, the better the element will mimic a switch type action.

The switch S can be implemented in semiconductor circuitry which is known as such, in order to provide a very cost effective solution. As long as the threshold voltage is not reached at the cell loading terminals T1, T2, the switch S will not be closed or conduct current, only a small leak current will flow through the semiconductor elements of switch S and first resistor R1. The specific choice of switch S and first resistor R1 will determine the total leakage current.

As illustrated in example FIG. 2, a balancer circuit in operation, for example, when a battery cell is electrically connected to the connecting terminals T1, T2, as well as a battery loader providing a load current $I_L$ using the load terminals L1 and L2. The adjustable voltage reference circuit U1 includes a first terminal 1 and a second terminal 2. The adjustable voltage reference circuit U1 provides a Zener diode-like functional element between the first and second terminal 1, 2, and the adjustable voltage reference circuit U1 further includes a third terminal 3 for input of a feedback signal.

The first resistor R1 is electrically connected between a terminal T1 of the cell and the first terminal 1 of the adjustable voltage reference circuit U1. The balancer circuit further includes a second resistor R2 and a third resistor R3. The second resistor R2 is electrically connected between the first terminal 1 and third terminal 3 while the third resistor R3 is electrically connected between the second terminal 2 and the third terminal 3.

As long as the voltage on the reference point (third terminal 3) of the adjustable voltage reference circuit U1 is lower than the threshold voltage, only a leakage current will flow. When the voltage on terminal 3 increases, the adjustable voltage reference circuit U1 will start conducting and a balancing current Ib will flow. The value of the balancing current Ib can be limited by the choice of the value of the first resistor R1. In an embodiment, the first resistor R1 has a value selected to set a balancing current Ib for the cell. This balancing current Ib is selected below a maximum rated current of the voltage switch S, in this embodiment of the adjustable voltage reference circuit U1.

The ratio of the second and third resistor R2, R3 can be chosen to select the threshold voltage, and as a deduced parameter the maximum charge voltage over the terminals T1, T2. The maximum charge voltage can be a recommended charge voltage of the cell, or alternatively can be an absolute maximum charge voltage of the cell.

As a result, a balancer circuit is provided which can be used for various types of cells, as the balancing current is adjustable by way of the first resistor R1 and the maximum charge voltage can be set by way of the second and third resistor R2, R3.

When a higher balancing current $I_b$ is desired, a number of balancer circuits as described in accordance with embodiments above may be used in parallel, as a result of which the total balancing current $I_b$ increases. Furthermore, a number of balancing circuits may be put in series to allow balancing of multiple cells arranged in a series configuration. This is illustrated in the schematic block diagram of example FIG. 3 for a series configuration of two cells. Also in this configuration multiple balancing circuits may be used in parallel if a higher balancing current $I_b$ is desired.

In the circuit diagram illustrated in example FIG. 3, a second balancing circuit is used, the components of which are marked with an apostrophe. In this circuit, three terminals T1-T3 are provided, a first cell of the series cell configuration being electrically connected to the upper two terminals T1, T2 in operation, and a second cell of the series cell configuration being electrically connected to the lower two terminals T2, T3.

In other words, in accordance with embodiments, a balancer arrangement is configured to provide a balancing current to a rechargeable battery having a plurality of cells in a series configuration, and includes a corresponding plurality of balancer circuits in accordance with embodiments. Consecutive balancer circuits share a common terminal (T2 in the embodiment of example FIG. 3) for electrical connection to an associated series configuration of cells. Operation of both the upper and lower balancing circuit is similar to the operation of the circuit described and illustrated above in example FIG. 2.

For a Lithium Iron Phosphate cell and using an LM385 integrated circuit as discussed above, the following exemplary calculations can be made for determining the values of the first, second and third resistor R1, R2 and R3. The recommended maximum charge voltage per cell is 3.6 Volt, and the absolute maximum voltage per cell is 4.3 Volt. The voltage on the first terminal 1 of element U1 (see FIG. 2) can be calculated as VB=VU1,ref (R3/R2+1), as provided in the following formula:

$$VB=1.24(196K/100K+1)=3.67 \text{ Volt } (R2=100 \text{ k}\Omega; R3=196 \text{ k}\Omega).$$

The formula shows that the threshold voltage to be used in the balancer circuit in accordance with embodiments can be set using the correct values of R2 and R3 in a wide range.

A similar calculation for a Lithium Polymer cell having a maximum cell voltage of 4.5 Volt, would be possible using the following formula:

$$VB=1.24(196 \text{ k}/75 \text{ k})+1)=4.48 \text{ Volt } (R2=75 \text{ k}\Omega; R3=196 \text{ k}\Omega).$$

Almost any threshold voltage can be set in a very wide range, as a result of which the balancer circuit in accordance with embodiments can be applied in almost all lithium-based and non-lithium based cells.

The balancing current $I_b$ can be set using the value of the first resistor. When taking a Lithium Polymer cell (with maximum voltage 4.3 Volt) and a Lithium Iron Phosphate cell (with maximum voltage 3.6 Volt), and a first resistor R1 of 5.7Ω as examples, the balancing currents may be calculated as follows:

$$Ib=(4.3-1.24)/5.7=0.53 \text{ A (at 4.3 Volt per cell)}$$

$$Ib=(3.6-1.24)/5.7=0.40 \text{ A (at 3.6 Volt per cell)}$$

Using a first resistor R1 having a value of 10Ω, the balancing currents will be as follows:

$$Ib=(4.3-1.24)/10=0.31 \text{ A (at 4.3 Volt per cell)}$$

$$Ib=(3.6-1.24)/10=0.24 \text{ A (at 3.6 Volt per cell)}$$

Using the above implementations of balancer circuits in accordance with embodiments, a battery pack may be provided having a plurality of rechargeable cells, such that one or more balancing circuits is provided for each one of the plurality of rechargeable cells. Furthermore, a battery pack in accordance with embodiments including a plurality of rechargeable cells in a series configuration may be provided, and also including a balancer arrangement for the series configuration of cells. The electronic components of the balancer circuit (R1-R3, U1 and the connecting terminals T1-T2) may be provided on very small PCB's or similar carriers, and easily integrated with the battery pack. When positioning the circuits in accordance with embodiments spatially close to each cell, the size and dimensions of the battery pack will not be changed at all, and weight will only increase by a small amount.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A balancer circuit for a cell in a rechargeable battery, the balancer circuit comprising:

connecting terminals configured to permit connection of the balancer circuit to the cell;

a first resistor electrically connected to one of the connecting terminals;

a voltage switch in series with the first resistor and electrically connected to another one of the connecting terminals, the voltage switch being operable to shunt a balancing current through the first resistor when a load voltage sensed over the connecting terminals is higher than a threshold voltage, wherein the voltage switch comprises an adjustable voltage reference circuit having a plurality of terminals, the plurality of terminals including a first terminal, a second terminal and a third terminal configured to input a feedback signal, the first resistor is electrically connected between a terminal of the cell and the first terminal of the adjustable voltage reference circuit, and the adjustable voltage reference circuit provides a Zener diode functional element between the first terminal and the second terminal;

a second resistor electrically connected between the first terminal and third terminal; and a third resistor electrically connected between the second terminal and the third terminal.

2. The balancer circuit of claim 1, wherein the ratio of the second resistor and the third resistor are chosen to select a maximum charge voltage.

3. The balancer circuit of claim 2, wherein the maximum charge voltage is a recommended charge voltage of the cell.

4. The balancer circuit of claim 2, wherein the maximum charge voltage is an absolute maximum charge voltage of the cell.

5. The balancer circuit of claim 1, wherein the first resistor has a value selected to set a balancing current for the cell.

6. The balancer circuit of claim 5, wherein the balancing current is selected below a maximum rated current of the voltage switch.

7. The balancer circuit of claim 1, wherein the cell is a lithium-based cell.

8. A balancer arrangement configured to provide a balancing current to a rechargeable battery having a plurality of cells in a series configuration, the balancer arrangement comprising:

a balancer circuit including:
connecting terminals configured to permit connection of the balancer circuit to the cell;
a first resistor electrically connected to one of the connecting terminals;
a voltage switch in series with the first resistor and electrically connected to another one of the connecting terminals, the voltage switch being operable to shunt a balancing current through the first resistor when a load voltage sensed over the connecting terminals is higher than a threshold voltage, wherein the voltage switch comprises an adjustable voltage reference circuit having a plurality of terminals, the plurality of terminals including a first terminal, a second terminal and a third terminal configured to input a feedback signal, the first resistor is electrically connected between a terminal of the cell and the first terminal of the adjustable voltage reference circuit, and the adjustable voltage reference circuit provides a Zener diode functional element between the first terminal and the second terminal, wherein consecutive balancer circuits share a common terminal for electrical connection to an associated series configuration of cells, a second resistor electrically connected between the first terminal and third terminal; and a third resistor electrically connected between the second terminal and the third terminal.

9. The balancer arrangement of claim 8, further comprising:

a second resistor electrically connected between the first terminal and third terminal; and a third resistor electrically connected between the second terminal and the third terminal, wherein the ratio of the second resistor and the third resistor are chosen to select a maximum charge voltage.

10. The balancer arrangement of claim 9, wherein the maximum charge voltage is one of:

a recommended charge voltage of the cell; and an absolute maximum charge voltage of the cell.

11. A battery pack comprising:

a plurality of rechargeable cells; and a balancer circuit including:
connecting terminals configured to permit connection of the balancer circuit to the cell;
a first resistor electrically connected to one of the connecting terminals; and
a voltage switch in series with the first resistor and electrically connected to another one of the connecting terminals, the voltage switch being operable to shunt a balancing current through the first resistor when a load voltage sensed over the connecting terminals is higher than a threshold voltage, wherein the voltage switch comprises an adjustable voltage reference circuit having a plurality of terminals, the plurality of terminals including a first terminal, a second terminal and a third terminal configured to input a feedback signal, the first resistor is electrically connected between a terminal of the cell and the first terminal of the adjustable voltage reference circuit, and the adjustable voltage reference circuit provides a Zener diode functional element between the first terminal and the second terminal, wherein each one of the plurality of rechargeable cells corresponds and is electrically connected to at least one balancing circuit, a second resistor electrically connected between the first terminal and third terminal; and a third resistor electrically connected between the second terminal and the third terminal.

12. The battery pack of claim 11, wherein:

the plurality of rechargeable cells are in a series configuration; and consecutive balancer circuits share a common terminal for electrical connection to an associated series configuration of cells.

* * * * *